3,382,496
MOVING TARGET INDICATOR RADAR
Isao Matsukasa and Syuji Nishimura, Tokyo-to, Japan, assignors to Nippon Electric Company, Limited, Tokyo-to, Japan
Filed Apr. 12, 1967, Ser. No. 630,334
Claims priority, application Japan, Apr. 12, 1966, 41/23,106
11 Claims. (Cl. 343—7.7)

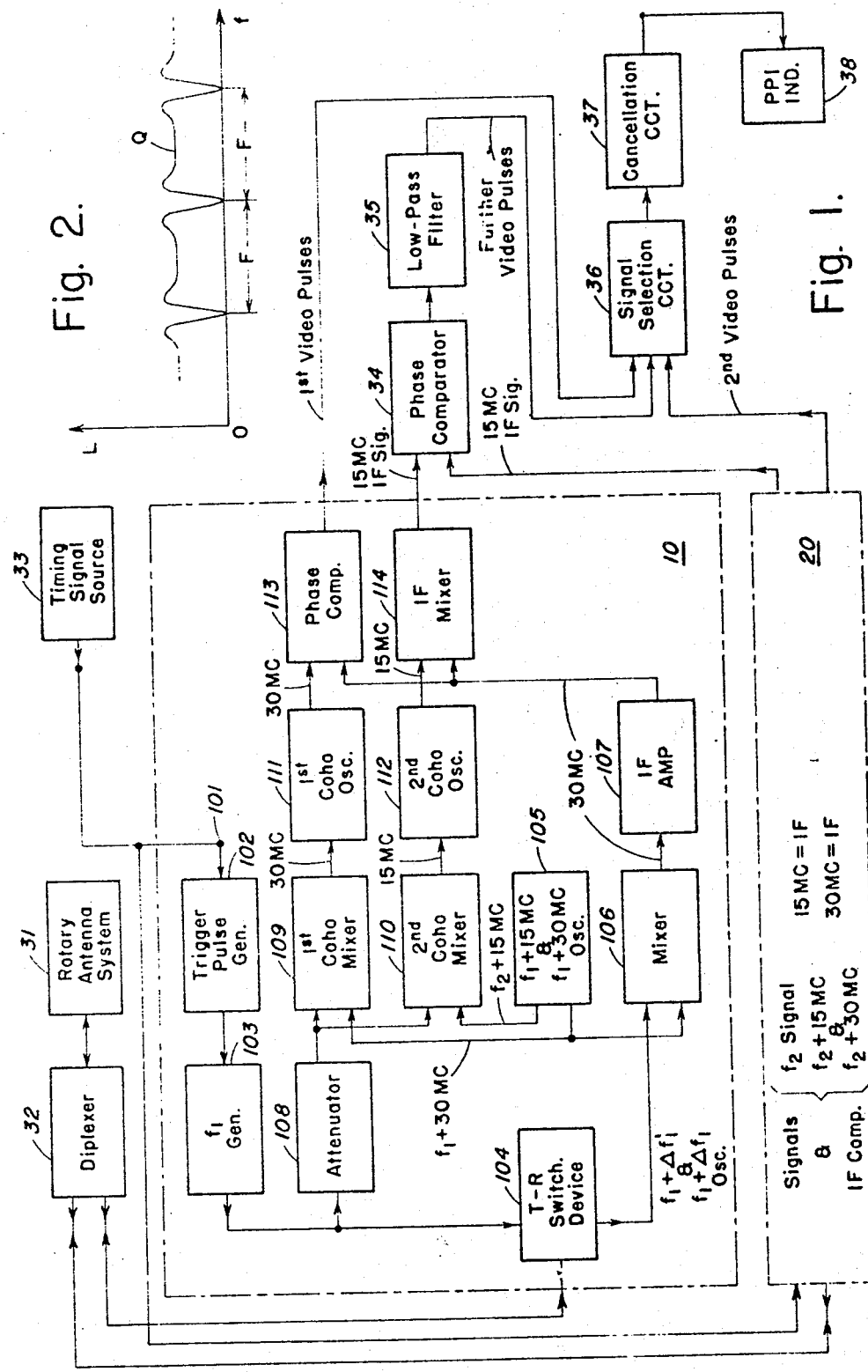

ABSTRACT OF THE DISCLOSURE

A moving target indicator for cancelling echo reflections due to a target moving below a given speed by producing first video pulses representing the phase difference between two intermediate frequency components derived from the signals of two different signal-transmitter-receiver devices to provide indications of the target, and different from second and third video pulses utilized to provide other indications of the target.

---

This invention relates to a moving target indicator radar and, more specifically, to such radar utilizing an arrangement for cancelling echo signals due to a target moving below a given speed.

A radar of the moving target indicator kind is usually constructed so that only the moving target echo component of the video signal converted from the received radio signal is displayed on a PPI oscilloscope, while the fixed target echo component is cancelled by a cancellation circuit comprising a delay line filter. As will be mentioned later, the cancellation circuit has a comb-like transmission characteristic which has the several steep valley portions disposed at a constant interval in the frequency spectrum. As the slope becomes steeper and the width of the valley becomes narrower in the comb-like transmission characteristic, the cancellation of the fixed target echo component becomes more effective. As a result, it is possible to indicate targets moving with considerably low speeds. The comb-like characteristic has been improved by the serial connection of several delay line filters or by passing the signal to be processed numerous times through a delay line filter. The improvements of such kind are described in detail in an article by H. Urkowitz disclosed at pages 41–53 of the "IRE Transactions on Circuit Theory," June 1957, and also in an article by W. D. White et al. disclosed at pages 186–199 of the IRE National Convention Record, part 2, 1957.

As the comb-like characteristic of the delay line filter is improved, the lower speed moving target can be displayed. Unfortunately, however, some undesired targets are also displayed on the PPI oscilloscope. For example, it is known that the Angel phenomenon is observed under particular weather conditions. This Angel phenomenon is interpreted as a result of a layer of the air, which has the concentration difference therein and is moving with a low speed, caught as a moving target. Also, other low speed moving targets, such as raindrops and snow, are similarly displayed on the PPI oscilloscope. If an undesired low speed moving target is displayed on the indicator, the effectiveness of the MTI radar is reduced, because a difficulty occurs in the reception of the desired image of the moving target, such as an airplane.

Known methods for lowering the sensitivity of the MTI radar for the low speed moving target are to lower the microwave frequency of the radiation pulse and to raise the repetition frequency of the radiation pulse. These methods, however, cannot practically be employed, because there are difficulties in making assurance of the resolution of the radar image and the measurable range.

Therefore, an object of the present invention is to provide an improved MTI radar in which the echo signal caused by a lower speed moving target can be cancelled.

The radar of the present invention comprises as the main elements a plurality of the MTI radar transmitter-receivers, which radiate the microwaves of different frequencies and produce besides the conventional video pulses, second intermediate frequency signals to be explained later. As a result of a phase comparison of the second intermediate frequency signals, further video pulses are obtained which cancel the echo signal from the lower speed moving target.

Since in the currently-operated radar two transmitter-receivers, one in use and the other in standby, are always put into operation in order to provide against a damage on the radar in use, the present invention provides an MTI radar in which the echo signal caused by the lower speed moving target is cancelled and the distinct MTI images are generated by making use of almost no additional device other than by fully making use of the above-mentioned standby transmitter-receiver.

The invention is explained hereinafter with reference to the accompanying drawing in which:

FIG. 1 is a block diagram showing a moving target indicator radar utilizing a specific embodiment of the present invention; and FIG. 2 is a frequency characteristic illustrating a partial performance of the embodiment in FIG. 1.

Referring to FIG. 1, the radar of the present invention comprises: a first transmitter-receiver 10 for ranging by the microwave pulses of the frequency $f_1$; a second transmitter-receiver 20 having the same construction as the first transmitter-receiver 10 for ranging by the microwave pulses of the frequency $f_2$; a rotary antenna system 31; a diplexer 32 for coupling the transmitter-receivers 10 and 20 with the antenna system 31; a timing signal source 33 for generating a timing signal for determining the time points when the microwave pulses have to be radiated from the transmitter-receivers 10 and 20; a phase comparator 34 for generating a video signal in response to two first outputs supplied from the transmitter-receivers 10 and 20; a low pass filter 35 for eliminating the high frequency component of the output video signal supplied from the phase comparator 34; a selection circuit 36 for selectively guiding the three video signals, which are the two second outputs of the transmitter-receivers 10 and 20 and the video signal supplied from the low pass filter 35, to its output; and a cancellation circuit 37 comprising a delay line filter and having the comb-like characteristic for cancelling an echo signal caused by a fixed target.

The first transmitter-receiver 10 is composed of: a trigger pulse generator 102 for generating a trigger pulse in response to the timing signal supplied from the timing signal source 33; a magnetron device 103 for generating a microwave pulse of the frequency $f_1$ in response to the above-mentioned trigger pulse; a transmission-reception switching device 104 for transmitting the microwave pulses through the above-mentioned diplexer 32 to the antenna system 31 and for receiving the echo signal caught by the antenna system 31 through the diplexer 32; a stable local oscillator 105 for generating two microwaves as first and second local oscillation signals, the frequencies of which are respectively 30 and 15 mc./s. higher than the echo signal frequency, namely the frequency of the radiated microwave pulses; a mixer 106 for converting the microwave echo signal to an intermediate frequency signal of 30 mc./s. in response to both the first local oscillation signal and the output supplied from the above-mentioned - transmission - reception switching device; an intermediate frequency amplifier 107 for amplifying the intermediate frequency signal; an attenuator 108 for attenuating the output microwave pulses supplied from the magnetron device 103; first and second coho-mixers 109 and 110 for respectively generating the coho-control pulses of the frequencies of 30 and 15 mc./s. in response to the output of the attenuator 108 and both the first and second local oscillation signals supplied from the above-mentioned local oscillator 105; first and second coho-oscillators 111 and 112 for respectively generating the coho-oscillation signals of the frequencies of 30 and 15 mc./s. in response to the coho-control pulses; a phase comparator 113 for generating a video signal by way of comparing the phase of the coho-oscillation signal of the frequency of 30 mc./s. supplied from the coho-oscillator 111 with that of the intermediate frequency signal supplied from the intermediate frequency amplifier 107; and an intermediate frequency mixer 114 for generating a second intermediate frequency signal of the frequency of 15 mc./s. in response to both the coho-oscillation signal of the frequency of 15 mc./s. supplied from the second coho-oscillator 112 and the above-mentioned intermediate frequency signal.

Since the constituent elements of the second transmitter-receiver 20 are identical to those of the first transmitter-receiver 10 except that microwave pulses of the oscillation frequency $f_2$ are generated by the magnetron device corresponding to the magnetron device 103 in the first transmitter-receiver 10, the second transmitter-receiver 20 is only shown in block form drawn by chain line with suitable legends. Since the timing pulse generated in the timing signal source 33 is also applied to the second transmitter-receiver 20 through an appropriate input terminal of a trigger pulse generator corresponding to the trigger pulse generator 102 in the first-transmitter-receiver 10, the transmitter-receivers 10 and 20 radiate simultaneously the microwave pulses of the frequencies $f_1$ and $f_2$. Also, the input and output of the second transmitter-receiver 20 correspond respectively to the input and output of the first transmitter-receiver 10. Namely, one of the two outputs of the transmitter-receiver 20 is a video signal indicating the result of the distance measurement performed by the microwave of the frequency $f_2$, while the other is a second intermediate frequency signal of the frequency of 15 mc./s. supplied from a mixer corresponding to the intermediate frequency mixer 114.

The two 15 mc./s. intermediate frequency signals supplied from the transmitter-receivers 10 and 20 are compared in phase in the phase comparator 34, wherein a video signal is consequently generated. The high frequency component of the output video signal supplied from the phase comparator 34 is cancelled by means of the low pass filter 35, because it is not necessary as will be described later.

Thus, the three video signals which are respectively obtained from the first and second transmitter-receivers 10 and 20, and the low pass filter 35, are selected in turn in the selection circuit 36 and then transmitted via cancellation circuit 37 for display on the PPI oscilloscope 38.

In the transmitter-receiver 10, its construction except the second coho-mixer 110, the second coho-oscillator 112 and the intermediate frequency mixer 114, is the one usually used in the conventional MTI radar for indicating only the moving target. For example, it is described in Figures 16.9 and 16.11 on page 632 of a publication entitled "Radar System Engineering" (McGraw-Hill Book Company, New York, 1949). The same description is also applied to the transmitter-receiver 20. Also, it is a known technique that the diplexer 32 is used as means for coupling the transmitter-receivers 10 and 20, in which the difference microwave frequencies are utilized, with the antenna system 31. The phase comparator 34 may be of the same construction as the phase comparator 113 in the transmitter-receiver 10. Moreover, the selection circuit 36 can be constructed as a manual rotary switch comprising three fixed contacts and a contact movable thereover. Since the cancellation circuit 37 is described in the articles by H. Urkowitz and W. D. White et al., supra, for those skilled in the art, a further explanation about it is omitted here.

As described above, the constituent elements, which are inherent in the present invention and not comprised in the conventional radar, are the second coho-mixer 110, the second coho-oscillator 112 and the intermediate frequency mixer 114 as referred to the transmitter-receiver 10. Since each of these elements is well known, the detailed explanation thereof is omitted.

Now, the performance of the radar will be described by mainly referring to the transmitter-receiver 10. When the trigger pulse generator 102 generates a trigger pulse in response to a timing pulse supplied from the timing signal source 33, the magnetron device 103 generates a microwave pulse of the frequency $f_1$. This microwave pulse is radiated in space from the rotary antenna system through the transmission-reception switching device 104 and the diplexer 32. The radiated microwave pulse is reflected by the fixed target and the moving target so that echo signal is caught by the antenna system 31 and finally supplied to the mixer 106 through the diplexer 32 and the transmission-reception switching device 104. The echo signal is mixed in the mixer 106 with the first local oscillation signal supplied from the local oscillator 105 with the result that it is converted to the intermediate frequency signal of the frequency of 30 mc./s. which is amplified in the intermediate frequency amplifier 107.

On the other hand, portions of the microwave pulse generated in the magnetron device 103 are transmitted to the first and second coho-mixers 109 and 110 through the attenuator 108 and then mixed in the coho-mixers 109 and 110 with the microwaves supplied from the stable local oscillator 105 to be converted to coho-control signals of the frequencies of 30 mc./s. and 15 mc./s. In response to these control signals, the first and second coho-oscillators 111 and 112 generate the coho-oscillation signals of the frequencies of 30 mc./s. and 15 mc./s. respectively.

The phase comparator 113 compares the phase of the coho-oscillation signal of the frequency 30 mc./s. as the reference phase signal with the phase of the intermediate frequency signal supplied from the intermediate frequency amplifier 107, and produces video pulses representing the envelope of the echo signal, which are supplied to one of the fixed contacts of the selection circuit. In view of the above, it is clear that these video pulses contain not only the echo signal caused by the moving target but also that caused by the fixed target. On the other hand, the coho-oscillation signal of the frequency 15 mc./s. is mixed in the intermediate frequency mixer 114 with the intermediate frequency signal supplied from the intermediate frequency amplifier 107 so that the second intermediate frequency signal of the frequency 15 mc./s. is generated, which is supplied to one of two input signals of the phase comparator 34.

Now, in the transmitter-receiver 20, wherein the distance measurement is performed by the microwave pulses of the frequency $f_2$, signal processing quite similar to that performed in the transmitter-receiver 10 is performed with the result that the video pulses and the second intermediate frequency signal of the frequency of 15 mc./s. are generated. The former is transmitted to one of the fixed contacts of the selection circuit 36, while the latter is transmitted as the other input of the phase comparator 34.

The phase comparator 34, which receives in the above-mentioned manner the two 15 mc./s. intermediate frequency signals of the transmitter-receivers 10 and 20, generates a further video pulse in response to the phase difference of such two intermediate frequency signals as in the manner carried out by the phase comparator 113. Since the latter video pulses, as will be mentioned later, contain the undesired components of the high frequency range, they are supplied to the third fixed contact of the selection circuit 36 after the high frequency components are eliminated by means of the low pass filter 35.

Assuming that the envelope of the microwave echo pulses of the frequency $f_1$, and the frequency shift in this microwave pulse caused by their reflection from the moving target, are represented by $P(t)$ and $df_1$, respectively, it is known that the output $V_1$ of the phase comparator 113 in the transmitter-receiver 10 is:

$$V_1 = K \sin 2\pi df_1 \cdot t \cdot P(t)$$

K is a constant. Similarly, the output $V_2$ of the phase comparator in the transmitter-receiver 20 is:

$$V_2 = K' \sin 2\pi df_2 \cdot t \cdot P(t)$$

By applying these known relations to the output of the intermediate frequency mixer 114, the second intermediate frequency signal $I_1$ of the transmitter-receiver 10 is:

$$I_1 = A \sin 2\pi (f_1 + df_1) \cdot t \cdot P(t)$$

A is a constant; $f_1$ is a second intermediate frequency. Identically, the intermediate frequency signal $I_2$ in the second transmitter-receiver 20 is:

$$I_2 = B \sin 2\pi (f_1 + df_2) \cdot t \cdot P(t)$$

B is a constant. Therefore, an output $V_3'$ of the phase comparator 34 is:

$$V_3' = C \sin 2\pi (df_1 - df_2) \cdot t \cdot P(t)$$
$$+ C \sin 2\pi (2f_1 + df_1 + df_2) \cdot t \cdot P(t)$$

Since a signal component corresponding to the second term of the above equation is cancelled by means of the low pass filter 35, the output $V_3$ of the filter 35 is:

$$V_3 = C \sin 2\pi (df_1 - df_2) \cdot t \cdot P(t)$$

In other words, the outputs supplied from the transmitter-receivers 10 and 20 are the functions of only $df_1$ and $df_2$ respectively, but on the contrary the output supplied from the filter 35 is a function of the difference of $df_1$ and $df_2$.

Referring to FIG. 2 in order to explain the performance of the radar keeping correspondence between the frequency characteristic of the cancellation circuit 37 with the above-mentioned video pulses $V_1$, $V_2$ and $V_3$, a portion Q of the characteristic shown in FIG. 2 shows the comb-like characteristic, in which the signal level L of the signal having passed therethrough is steeply lowered at frequency intervals corresponding to the repetition frequency F of the microwave pulses of the frequencies $f_1$ and $f_2$. As the characteristic is described in detail in the above-mentioned articles by Urkowitz and White et al., it will be here explained simply. When the video pulses $V_1$ and $V_2$ contain only the echo signals caused by the fixed targets, any output of the cancellation circuit 37 does not appear, because the time intervals in each video pulse train are constant and the spectral components of the echo signal are approximately in registry with the valley portions of the characteristic Q.

On the other hand, when the video pulses $V_1$ and $V_2$ contain the echo signal caused by the moving target, a new component appears in the frequency spectrum outside the valley of the characteristic Q because the frequency shifts $df_1$ and $df_2$ appear in the video pulses, with the resulting appearance of output of the cancellation circuit 37. The higher the speed of the moving target becomes, the larger, the frequency shifts $df_1$ and $df_2$ become so that the position of the new component is displaced further from the valley. Hence, the output appears certainly in the circuit 37. When the speed of the moving target is lower than a given value, the output of the cancellation circuit 37 does not appear, because both $df_1$ and $df_2$ are included inside the valley of the characteristic Q. On the contrary, since the video pulse $V_3$ is a function of the difference of the frequency shifts $df_1$ and $df_2$, the output of the cancellation circuit 37 does not appear if the difference of $df_1$ and $df_2$ is included inside the valley of the curve Q although the output of the cancellation circuit 37 may appear due to the fact that the components $df_1$ and $df_2$ are outside of the latter valley. In other words, the echo signal caused by the lower speed moving target, which cannot be eliminated by the video pulses $V_1$ or $V_2$ only, can be eliminated by use of the video pulse $V_3$.

When the radar of the present invention is actually used, the video pulses $V_1$ or $V_2$ supplied from the transmitter-receiver 10 or 20 is at first applied to the cancellation circuit 37 by manually coupling the movable contact of the selection circuit 36 to the first or second fixed contact of it, so that they may be indicated on the PPI oscilloscope 38. Next, the video pulses $V_3$ are applied to the cancellation circuit 37 by connecting the movable contact of the selection circuit 36 to the third fixed contact. As mentioned above, since the image of the lower speed target, which is indicated on the PPI oscilloscope in case of using the video pulses $V_1$ or $V_2$, does not appear in case of using the video pulse $V_3$. The echo signal of the undesired lower speed target, which appears as a result of the above-mentioned Angel phenomenon can be cancelled. Although the above advantage is obtained by combining the two radar transmitter-receivers 10 and 20, this does not limit the effectiveness of the invention, because it is common for the currently operated radar to comprise two transmitter-receivers, one in use and the other as a precaution against a trouble.

Although in the embodiment it is illustrated that the transmitter-receivers 10 and 20 transmit simultaneously the microwave pulses of the frequencies $f_1$ and $f_2$, the timing pulse supplied from the timing signal source 33 may be modified so as to shift the radiation timing of the pulses from each other. In this case, a delay device is suitably inserted in order to adjust the phase relation between the two second intermediate frequency signals. Also, in case there is inevitable phase fluctuation in the local oscillation signal supplied from the corresponding local oscillator in the second transmitter-receiver 20, it is possible to compensate the phase fluctuation by providing a reference frequency signal source for both the transmitter-receivers and respectively applying a reference frequency signal to the phase fluctuation compensation circuits, which are disposed between the local oscillator 105 and the second coho-mixer 110 and at the corresponding position in the transmitter-receiver 20. Furthermore, although it is explained that the selection circuit 36 is constructed by means of the manual rotary switch in which there are three fixed contacts on the input side and one movable contact on the output side, the circuit 36 can be replaced by an electronic switching circuit, such as a circuit utilizing semiconductors. Although in the foregoing embodiment two kinds of the microwave pulses of the frequencies $f_1$ and $f_2$ are employed, more kinds of the microwave pulses can be used.

It is understood that the invention herein is described in specific respects for the purpose of this description. It is also understood that such respects are merely illustrative of the application of the principles of the invention. Numerous other arrangements may be devised by those skilled in the art without departing from the spirit and scope of the invention.

What is claimed is:
1. A radar providing indications of a target moving at a speed above or below a given speed, comprising in combination:
   an antenna,
   a timer,
   a delay line filter,
   an indicator,
   a first transmitter-receiver including:
       means activated by said timer for generating a first high-frequency signal of a first predetermined frequency at preselected time intervals, means for supplying one portion of said first signal to said antenna and for receiving therefrom said last-mentioned signal one portion as reflected from said target, means for converting said reflected signal one portion into a first intermediate signal of a second predetermined frequency, means for converting a second portion of said first signal and one portion of said first intermediate frequency signal into first video pulses representing the envelope of said reflected first signal one portion, and means for converting a third portion of said first signal and another portion of said first intermediate frequency signal into a second intermediate signal of a third predetermined frequency, a second transmitter-receiver including:

means activated by said timer for generating a second high-frequency signal of a fourth predetermined frequency at preselected time intervals, means for supplying one portion of said signal to said antenna and for receiving therefrom said second signal one portion as reflected from said target, means for converting said reflected second signal one portion into a third predetermined intermediate signal of a frequency equal to said second predetermined frequency of said first intermediate frequency signal, means for converting a second portion of said second signal and one portion of said third intermediate frequency signal into second video pulses representing the envelope of said reflected second signal one portion, and means for converting a third portion of said second signal and another portion of said third intermediate frequency signal into a fourth intermediate signal of a frequency equal to the frequency of said second intermediate frequency signal, means for comparing the phases of said second and fourth intermediate frequency signals to produce further video pulses representing the phase difference between said last-mentioned signals and including unwanted frequency components, filter means for attenuating said unwanted frequency components in said further video signals, and means for selectively transmitting said first, second and further video pulses in turn through said delay line filter to said indicator to preclude said further video pulses from providing on said indicator visual indications of said target moving at a speed below said given speed.

2. The radar according to claim 1 in which said first transmitter-receiver includes said reflected first signal one portion converting means, consisting of:

a local oscillator for providing a signal of a frequency which is higher by said second predetermined frequency of said first intermediate frequency signal than the frequency of said reflected one signal portion, and a mixer for converting said reflected one signal portion and local signal into said first intermediate frequency signal.

3. The radar according to claim 1 in which said first transmitter-receiver includes said converting means for said second portion of said first signal, consisting of:

a first local oscillator for producing a signal of a frequency which is higher by said second predetermined frequency of said first intermediate frequency signal than the frequecy of said last-mentioned first signal, a mixer for converting said first local signal and second portion of said first signal into control pulses of a frequency equal to said last-mentioned second predetermined frequency, a second local oscillator activated by said control pulses to produce oscillations of a frequency equal to the frequency of said last-mentioned pulses, and second means for comparing the phases of said last-mentioned oscillations and one portion of said first intermediate frequency signal to produce said first video pulses.

4. The radar according to claim 1 in which said first transmitter-receiver includes said converting means for said third portion of said first signal, consisting of:

a first local oscillator for producing a signal of a frequency which is higher by said third predetermined frequency of said second intermediate frequency signal than the frequency of said first signal, a first mixer for converting said first local signal and third portion of said first signal into control pulses of a frequency equal to said third predetermined frequency of said second intermediate frequency signal, a second local oscillator activated by said last-mentioned control pulses to produce oscillations of a frequency equal to the frequency of said last-mentioned control pulses, and a second mixer for converting said last-mentioned oscillations and another portion of said first intermediate frequency signal into said second intermediate frequency signal.

5. The radar according to claim 1 in which said first transmitter-receiver includes said means for converting said reflected one portion of said first signal, consisting of:

a first local oscillator for producing a signal of a frequency which is higher by said second predetermined frequency of said first intermediate frequency signal than the frequency of said reflected first signal one portion, and a first mixer for converting said reflected first signal one portion and one portion of said first local signal into said first intermediate frequency signal, said means for converting said second portion of said first signal, consisting of:

a second mixer for converting said second portion of said first signal and another portion of said first local signal into first control pulses of a frequency equal to said second predetermined frequency of said first intermediate frequency signal, a second local oscillator activated by said last-mentioned control pulses to produce first oscillations of a frequency equal to the frequency of said last-mentioned pulses, and second means for comparing the phases of said last-mentioned oscillations and one portion of said first intermediate frequency signal to produce said first video pulses, said means for converting said third portion of said first signal, consisting of:

a third local oscillator of a frequency which is higher by said third predetermined frequency of said second intermediate frequency signal than the frequency of said first signal, a third mixer for converting said third local signal and third portion of said first signal into second control pulses of a frequency equal to said third predetermined frequency of said second intermediate frequency signal, a fourth local oscillator activated by said last-mentioned control pulses to produce second oscillations of a frequency equal to the frequency of said last-mentioned pulses, and a fourth mixer for converting said last-mentioned oscillations and another portion of said first intermediate frequency signal into said second intermediate frequency signal.

6. The radar according to claim 1 in which said second transmitter-receiver includes said converting means for said one portion of said second signal, consisting of:
   a local oscillator for producing a signal of a frequency which is higher by said second predetermined frequency of said first intermediate frequency signal than the frequency of said second signal one portion, and
   a mixer for converting said local signal and said one portion of said second signal into said third predetermined intermediate frequency signal.

7. The radar according to claim 1 in which said second transmitter-receiver includes said converting means for said second portion of said second signal, consisting of:
   a first local oscillator for producing a signal which is higher by said second predetermined frequency of said first intermediate frequency signal than the frequency of said last-mentioned second signal,
   a mixer for converting said first local signal and second portion of said second signal into control pulses of a frequency equal to said last-mentioned second predetermined frequency,
   a second local oscillator activated by said last-mentioned control pulses to produce oscillations of a frequency equal to the frequency of said last-mentioned pulses, and
   second means for comparing the phases of said last-mentioned oscillations and one portion of said third intermediate frequency signal to produce said second video pulses.

8. The radar according to claim 1 in which said second transmitter-receiver includes said converting means for said third portion of said second signal, consisting of:
   a first local oscillator for producing a signal of a frequency which is higher by the frequency of said fourth intermediate frequency signal than the frequency of said last-mentioned second signal,
   a first mixer for converting said third portion of said second signal and first local signal into control pulses of a frequency equal to the frequency of said last-mentioned fourth intermediate frequency signal,
   a second local oscillator activated by said last-mentioned control pulses to produce oscillations of a frequency equal to the frequency of said last-mentioned pulses, and
   a mixer for converting said last-mentioned oscillations and another portion of said third intermediate frequency signal into said fourth intermediate frequency signal.

9. The radar according to claim 1 in which said second transmitter-receiver includes said means for converting said reflected one portion of said second signal, consisting of:
   a first local oscillator for producing a signal which is higher by said second predetermined frequency of said first intermediate frequency signal than the frequency of said reflected second signal one portion, and
   a first mixer for converting said reflected second signal one portion and one portion of said first local signal into said third intermediate frequency signal,
   said means for converting said second portion of said second signal, consisting of:
      a second mixer for converting said second portion of said second signal and another portion of said first local signal into first control pulses of a frequency equal to said second predetermined frequency of said first intermediate frequency signal, a second local oscillator activated by said last-mentioned control pulses to produce first oscillations of a frequency equal to the frequency of said last-mentioned pulses, and
      second means for comparing the phases of said last-mentioned oscillations and one portion of said third intermediate frequency signal to produce said second video pulses,
   said means for converting said third portion of said second signal, consisting of:
      a third local oscillator for producing a signal of a frequency which is higher by the frequency of said fourth intermediate frequency signal than the frequency of said second signal,
      a third mixer for converting said third local signal and third portion of said second signal into second control pulses of a frequency equal to the frequency of said fourth intermediate frequency signal,
      a fourth local oscillator activated by said last-mentioned control pulses to produce second oscillations of a frequency equal to the frequency of said last-mentioned pulses, and
      a fourth mixer for converting said last-mentioned oscillations and another portion of said third intermediate frequency signal into said fourth intermediate frequency signal.

10. The radar according to claim 1 in which said first transmitter-receiver includes said means for converting said reflected one portion of said first signal, consisting of:
   a first local oscillator for producing a signal of a frequency which is higher by said second predetermined frequency of said first intermediate frequency signal than the frequency of said last-mentioned first signal one portion, and
   a first mixer for converting said last-mentioned reflected first signal one portion and one portion of said first local signal into said first intermediate frequency signal,
   said means for converting said second portion of said first signal, consisting of:
      a second mixer for converting said second portion of said first signal and other portion of said first local signal into first control pulses of a frequency equal to said second predetermined frequency of said first intermediate frequency signal,
      a second local oscillator activated by said last-mentioned control pulses to produce first oscillations of a frequency equal to the frequency of said last-mentioned pulses, and
      second means for comparing the phases of said last-mentioned oscillations and one portion of said first intermediate frequency signal to produce said first video pulses,
   said means for converting said third portion of said first signal, consisting of:
      a third local oscillator for producing a signal of a frequency which is higher by said third predetermined frequency of said second intermediate frequency signal than the frequency of said first signal,
      a third mixer for converting said third local signal and third portion of said first signal into second control pulses of a frequency equal to said third predetermined frequency of said second intermediate frequency signal,
      a fourth local oscillator activated by said last-mentioned control pulses to produce second oscillations of a frequency equal to the frequency of said last-mentioned pulses, and
      a fourth mixer for converting said last-mentioned oscillations and another portion of said first intermediate frequency signal into said second intermediate frequency signal,
   said second transmitter-receiver includes said means for converting said reflected one portion of said second signal, consisting of:
      a fifth local oscillator producing a signal of a frequency which is higher by said second predetermined frequency of said first intermediate frequency signal than the frequency of said reflected second signal one portion, and a fifth mixer for converting said reflected second signal one portion and one portion of said fifth local signal into said third intermediate frequency signal, said means for converting said second portion of said second signal, consisting of:

a sixth mixer for converting said second portion of said second signal and another portion of said fifth local signal into third control pulses of a frequency equal to said second predetermined frequency of said first intermediate frequency signal, a seventh local oscillator activated by said last-mentioned control pulses to produce third oscillations of a frequency equal to the frequency of said last-mentioned pulses, and third means for comparing the phases of said last-mentioned oscillations and one portion of said third intermediate frequency signal to produce said second video pulses, said means for converting said third portion of said second signal, consisting of:

a sixth local oscillator for producing a signal of a frequency which is higher by the frequency of said fourth intermediate frequency signal than the frequency of said second signal, a seventh mixer for converting said sixth local signal and third portion of said second signal into fourth control pulses of a frequency equal to the frequency of said fourth intermediate frequency signal, an eighth local oscillator activated by said last-mentioned control pulses to produce fourth oscillations of a frequency equal to the frequency of said last-mentioned pulses, and an eighth mixer for converting said last-mentioned oscillations and another portion of said third intermediate frequency into said fourth intermediate frequency signal.

11. A radar providing indications of a target moving at a speed above or below a given speed, comprising in combination:

an antenna,
a timer,
a delay line filter,
an indicator,
a first transmitter-receiver including:

means activated by said timer to generate a first high-frequency signal of a first predetermined frequency at preselected time intervals, means for supplying one portion of said first signal to said antenna and for receiving therefrom said last-mentioned signal one portion as reflected from said target, means for converting said reflected signal one portion into a first intermediate frequency signal of a second predetermined frequency, including:

a first local oscillator producing a signal of a frequency which is higher by said second predetermined frequency than the frequency of said reflected signal one portion, and a first mixer for converting said reflected signal one portion and one portion of said first local signal into said first intermediate frequency signal, means for converting a second portion of said first high-frequency signal and one portion of said first intermediate frequency signal into first video pulses, including:

a second mixer for converting said second portion of said first high-frequency signal and another portion of said first local signal into first control pulses of a frequency equal to said second predetermined frequency of said first intermediate frequency signal, a second local oscillator activated by said last-mentioned control pulses to produce first oscillations of a frequency equal to the frequency of said last-mentioned pulses, and first means for comparing the phases of one portion of said first intermediate frequency signal and said last-mentioned oscillations to produce first video pulses representing the envelope of said reflected first high-frequency signal one portion, means for converting a third portion of said first high-frequency signal and another portion of said first intermediate frequency signal into a second intermediate frequency signal of a third predetermined frequency, including:

a third local oscillator for producing a signal of a frequency which is higher by said third predetermined frequency of said second intermediate frequency signal than the frequency of said first high-frequency signal, a third mixer for converting said first high-frequency signal third portion and third local signal into second control pulses of a frequency equal to said third predetermined frequency of said second intermediate frequency signal, a fourth local oscillator activated by said last-mentioned control pulses to produce second oscillations of a frequency equal to the frequency of said last-mentioned pulses, and a fourth mixer for converting said last-mentioned oscillations and another portion of said first intermediate frequency signal into said second intermediate frequency signal, a second transmitter-receiver including:

means activated by said timer to generate a second high-frequency signal of a fourth predetermined frequency at said preselected time intervals, and means for supplying one portion of said last-mentioned signal to said antenna and for receiving therefrom said last-mentioned signal one portion as reflected from said target, means for converting said last-mentioned reflected signal one portion into a third intermediate signal of a frequency equal to the frequency of said first intermediate frequency signal, including:

a fifth local oscillator producing a signal of a frequency which is higher by said second predetermined frequency of said first intermediate frequency signal than the frequency of said last-mentioned reflected second signal one portion, and a fifth mixer for converting said last-mentioned reflected signal one portion and one portion of said fifth local signal into said third intermediate frequency signal, means for converting a second portion of said second high-frequency signal and one portion of said third intermediate frequency signal into second video pulses, including:

a sixth mixer for converting said last-mentioned second portion of said second signal and another portion of said fifth local signal into third control pulses of a frequency equal to said second predetermined frequency of said first intermediate frequency, a sixth local oscillator activated by said last-mentioned control pulses to produce oscillations of a frequency equal to the frequency of said last-mentioned pulses, and second means for comparing the phases of said last-mentioned oscillations and one portion of said third intermediate frequency signal to produce said second video pulses representing the envelope of said reflected second high-frequency signal one portion, means for converting a third portion of said second high-frequency signal and another portion of said third intermediate frequency signal into a fourth intermediate frequency signal of a frequency equal to the frequency of said second intermediate frequency signal, including:
- a seventh local oscillator for producing a signal of a frequency which is higher by said third predetermined frequency of said second intermediate frequency signal than the frequency of said second high-frequency signal,
- a seventh mixer for converting said seventh local signal and third portion of said second high-frequency signal into fourth control pulses of a frequency equal to said third predetermined frequency of said second intermediate frequency signal,
- an eighth local oscillator activated by said last-mentioned pulses to produce oscillations of a frequency equal to the frequency of said last-mentioned pulses,
- an eighth mixer for converting said last-mentioned oscillations and another portion of said third intermediate frequency signal into said fourth intermediate frequency signal, third means for comparing the phases of said second and fourth intermediate frequency signals to produce further video signals representing the phase difference between said last-mentioned signals and including unwanted frequency components, filter means for attenuating said unwanted frequency components in said further video signals, and means for selectively transmitting said first, second and further video pulses in turn through said delay line filter to said indicator to preclude said further video pulses from providing on said indicator visual indications of said target moving at a speed below said given speed.

No references cited.

RODNEY D. BENNETT, *Primary Examiner.*

C. L. WHITHAM, *Assistant Examiner.*